United States Patent [19]

Schreiber

[11] 3,759,653

[45] Sept. 18, 1973

[54] EXTRUSION DIE WITH ARCHED CHOKE BAR

[75] Inventor: Anthony J. Schreiber, Philadelphia, Pa.

[73] Assignee: Standard Oil Company, Chicago, Ill.

[22] Filed: June 30, 1971

[21] Appl. No.: 158,405

[52] U.S. Cl.................. 425/461, 425/192, 425/376
[51] Int. Cl............................................ B29f 3/04
[58] Field of Search................... 425/376, 381, 461, 425/465, 466, 467, 192; 264/176 R

[56] References Cited
UNITED STATES PATENTS

| | | | |
|---|---|---|---|
| 3,559,239 | 2/1971 | Work et al. | 425/131 |
| 1,715,859 | 6/1929 | Norton | 425/466 |
| 3,080,608 | 3/1963 | Van Riper | 425/466 X |
| 3,217,358 | 11/1965 | Kihara | 425/376 |

Primary Examiner—J. Spencer Overholser
Assistant Examiner—Michael O. Sutton
Attorney—Arthur G. Gilkes et al.

[57] ABSTRACT

A film extrusion die comprising: a body having (1) means defining an inlet recess; (2) a longitudinally extending passageway communicating with said recess; (3) an extrusion manifold in flow communication with said inlet passageway extending substantially the entire width of the die; and (4) opposed wall portions in flow communication with said manifold which form an extrusion passageway leading from said manifold, one of said opposed wall portions being provided with a transversely disposed channel, and (5) a transversely disposed arched metering bar received in said channel, said bar including an extending portion which projects into said extrusion passageway leading from said manifold; a set of lips forming an elongated extrusion orifice extending substantially the entire width of the die with said set of lips attached to said body in flow communication with said extrusion passageway; and two die endplates, one attached to each end of said body respectively encapsulating each end of said manifold, extrusion passageway and lips.

3 Claims, 3 Drawing Figures

3,759,653

PATENTED SEP 18 1973

INVENTOR
ANTHONY J. SCHREIBER

BY *Robert W. Fletcher*
ATTORNEY

EXTRUSION DIE WITH ARCHED CHOKE BAR

BACKGROUND OF THE INVENTION

Thermoplastic resins have long been an important material of construction for packaging film. Generally such film is produced by extruding a heat plasticized thermoplastic resin through a flat film die and then cooling it. The cooling may be accomplished in a variety of ways, two of the most common are extruding the polymeric resin into a water bath or onto a chill roll.

In the design and operation of a flat film die for the extrusion of heat plasticized thermoplastic resins, two problems frequently arise. The first problem is directly related to the fact that in any extruding operation there exists within the die, flow gradients of heat plasticized thermoplastic resins which result in variable amounts of the resins being extruded over the width of the die. The second problem is related to the first and is generally a consequence thereof. This problem is that small amounts of heat plasticized thermoplastic resin may dwell in the die for a prolonged period of time and become thermally degraded. Such thermally degraded small amounts of thermoplastic resin may subsequently be carried out of the die and become imperfections in the extruded film surface. The situation inside the flat film die that leads to thermoplastic resin degradation may be better understood by visualizing that there exists channels and islands of heat plasticized thermoplastic resin within the operating die. It is the islands of heat plasticized thermoplastic which dwell in the die and subsequently thermally degrade. The invention of this disclosure reduces the number of islands and the subsequent degradation of the heat plasticized thermoplastic resin inside the die.

SUMMARY OF THE INVENTION

A film extrusion die comprising: a body having (1) means defining an inlet recess; (2) a longitudinally extending passageway communicating with said recess; (3) an extrusion manifold in flow communication with said inlet passageway extending substantially the entire width of the die; and (4) opposed wall portions in flow communication with said manifold which form an extrusion passageway leading from said manifold, one of said opposed wall portions being provided with a transversely disposed channel, and (5) a transversely disposed arched metering bar received in said channel, said bar including an extending portion which projects into said extrusion passageway leading from said manifold; a set of lips forming an elongated extrusion orifice extending substantially the entire width of the die with said set of lips attached to said body in flow communication with said extrusion passageway; and two die endplates, one attached to each end of said body respectively encapsulating each end of said manifold, extrusion passageway and lips.

The arched metering bar of this invention tends to restrict the area in the extrusion passageway which is directly below the longitudinally extending passageway, where the most rapid flow of the heat plasticized resin normally occurs, yet it encourages the flow at the outer limits of the extrusion passageway where it is normally less rapid. In essence, the arched metering bar of this invention changes the geometry of the extrusion passageway below the die manifold. This change in geometry promotes a uniform flow of heat plasticized thermoplastic resin in the extrusion passageway below the arched metering bar. The overall effect is to have essentially equal flow rates of heat plasticized thermoplastic resin across the entire die at the extrusion orifice. By equalizing the flow rate of the heat plasticized thermoplastic resin the arched metering bar of this invention eliminates islands and channeling, especially in the lower portions of the die. The lower portion of the die is, of course, the portion which is most likely to contain thermally degraded heat plasticized resin since the resin has been in the die a substantial length of time by the time it reaches the lower portion of the die.

PREFERRED EMBODIMENTS

Figure 1:
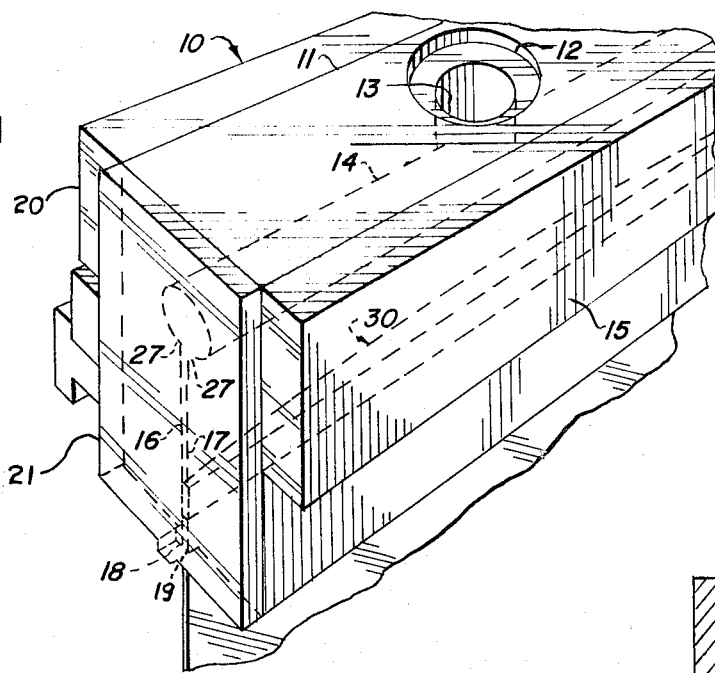
FIG. 1 is a perspective view of the die of this invention showing the arched metering bar received by a channel in the extrusion passageway of the die.
Figure 2:
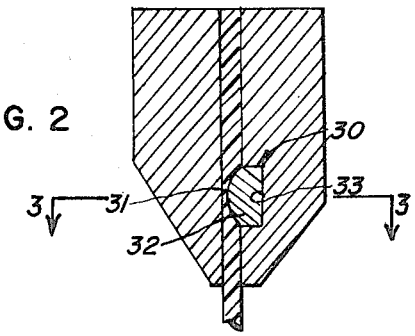
FIG. 2 is a partial cross sectional elevational view of the end of a second die having a metering bar.

In FIG. 1 die 10 is comprised of body 11 having hot melt inlet recess 12 and vertically extending passageway 13 in communication therewith. Extrusion manifold 14 is contained in body 11 and is in flow communication with vertically extending passageway 13. Extrusion manifold 14 extends substantially the entire width of the die. Body 11 also contains opposed planar wall portions 16 and 17 which form an extrusion passageway leading from manifold 14. Wall portions 16 and 17 may be referred to by those skilled in the extrusion art as the flow channel or, alternatively, the die preland. Opposed planar wall portions 16 and 17 extend downwardly and terminate in die lips 18 and 19. Most commonly one of the die lips 18 or 19 is mechanically attached to body 11 and adjustable, while the other is generally nonadjustable. Body 11 may also have attached heater elements 15 and 20. Two endplates 21 are attached, one at either end of body 11. Endplates 21 encapsulate the respective ends of manifold 14, the extrusion passageway defined by wall portions 16 and 17, and lips 18 and 19.

Figure 3:
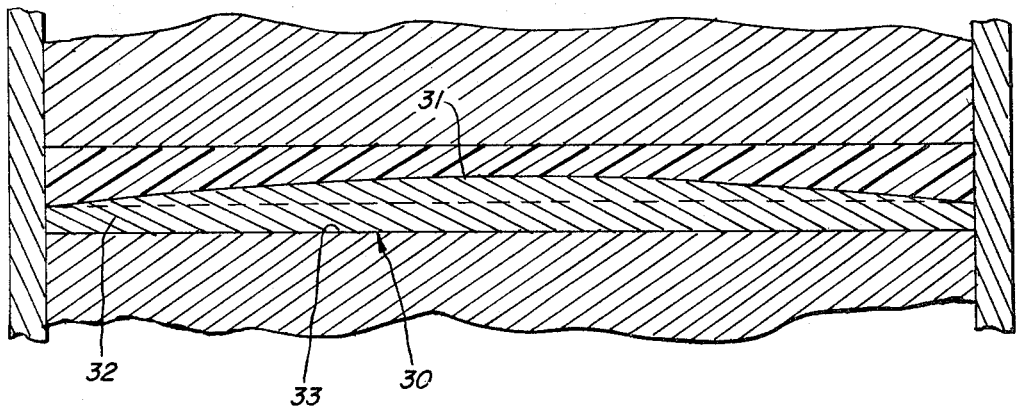
FIG. 3 is a plan view taken along the line 2—2' of the die of FIG. 2.

The principal feature of this invention is an arched metering bar 30 which is comprised of extending portion 31 and received portion 32. Received portion 32 is received by channel 33 which is contained in opposed wall portion 17. Arched metering bar 30 forms a restriction in the extrusion passageway formed by opposed wall portions 16 and 17 and promotes the even distribution of heat plasticized thermoplastic resin over the entire width of the die. FIG. 3 shows the geometry of the restriction formed by arched metering bar 30.

In the operation of this invention, the heat plasticized thermoplastic resin passes downwardly through the extrusion passageway and is then redistributed by arched metering bar 30 in such a manner that the flow downstream thereof is smooth, even and unidirectional. Such flow thereby promotes a smooth, even uniform film product.

It is also clear that since arched metering bar 30 extends from only one of the opposing sidewalls it could easily be replaced by a channel filler bar which would essentially form no extension into the extrusion passageway. Such a channel filler bar would be useful to prevent accumulation and thermal degradation of thermoplastic resin in channel 33 in the event that the arched metering bar were not used.

The function of the arched metering bar of this invention is new and novel when viewed in light of the prior art. For example, U.S. Pat. No. 3,133,313 shows an oscillator rod which is mounted for reciprocatory movement in the preland area of a flat film die. The function of an oscillating rod as proclaimed therein is to induce a flow variation at a controlled rate upon the melt so that gauge limits across the final web will fall at random points to give a smooth appearing, wrinkle-free roll. Such is not the objective of the invention of this disclosure. But, rather, the arched metering bar as described and claimed herein restricts the amount of heat plasticized thermoplastic material which passes downstream of it over the entire width of the die. The result is a more uniform quantity of thermoplastic material being extruded for any unit of die orifice length per unit of time. Another result is that mechanical adjustment of the die lips 18 and 19 is obviated, with the net result being an adjustmentless die.

EXAMPLE I

Heat plasticized polypropylene resin was extruded through a die fitted with an arched metering bar as shown in the figures. The arched metering bar was positioned in the preland area of the die as shown in FIG. 1. The arched metering bar had a radius of curvature of 265 feet. The die had an effective width of 22 5/8 inches. Correspondingly, a 22 5/8 inches metering bar was used. The arched metering bar had a curvacious surface constituting the side surface of extending portion 31. The height of extending portion 31 was 0.250 inches. The distance between the die lips was about 0.022 inches. The distance between opposed wall portions 16 and 17 was 0.120 inches. Heat plasticized polypropylene resin was extruded through the die. The resultant film product was found to have a width of 20.125 inches.

EXAMPLE II

Heat plasticized polypropylene resin was extruded through the die used in Example II. The heat plasticized polypropylene resin contained about 0.5 wt. percent of 1,1'-Azobis formmide (azodicarbonamide) as foaming agent. The resultant film product was found to have a width of 20 1/8 inches. With the arched metering bar the film product was found to have a greater uniformity of thickness for the width of the product die lip without the necessity of repeated adjustment.

Having thus described the invention, what is claimed is:

1. A film extrusion die comprising: a body having (1) an inlet recess; (2) a longitudinally extending passageway communicating with said recess; (3) an extrusion manifold extending substantially the entire width of the die in flow communication with said longitudinally extending passageway; (4) opposed wall portions in flow communication with said manifold which form an extrusion passageway leading from said manifold, one of said opposed wall portions being provided with a transversely disposed channel and a fixed arched metering bar in said channel, said metering bar including an extending portion which projects into said extrusion passageway, said extending portion having its point of furthest projection substantially in line with said longitudinally extending passageway; (5) a set of lips forming an elongated extrusion orifice in flow communication with said extrusion passageway; and (6) two die endplates, one attached to each end of said body, encapsulating each end of said manifold, extrusion passageway, and die lips.

2. The film extrusion die of claim 1 wherein the arched metering bar has a radius of curvature of 265 feet.

3. The film die of claim 1 wherein the arched metering bar has a curvacious surface which constitutes the side surface of said extending portion.

* * * * *